United States Patent
Lissoni et al.

(10) Patent No.: US 9,456,474 B2
(45) Date of Patent: Sep. 27, 2016

(54) BIASING AND DRIVING CIRCUIT, BASED ON A FEEDBACK VOLTAGE REGULATOR, FOR AN ELECTRIC LOAD

(71) Applicant: STMicroelectronics S.R.L., Agrate Brianza (IT)

(72) Inventors: Fulvio Ottavio Lissoni, Trezzano sul Naviglio (IT); Domenico Attianese, Aosta (IT); Stefano Signoria, Nerviano (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 14/849,314

(22) Filed: Sep. 9, 2015

(65) Prior Publication Data
US 2016/0227614 A1 Aug. 4, 2016

(30) Foreign Application Priority Data
Jan. 29, 2015 (IT) ................ TO2015A0065

(51) Int. Cl.
H05B 37/02 (2006.01)
H05B 33/08 (2006.01)
H02M 7/217 (2006.01)

(52) U.S. Cl.
CPC ......... *H05B 33/0809* (2013.01); *H02M 7/217* (2013.01)

(58) Field of Classification Search
CPC .......... H05B 33/0818; H05B 33/0839; H05B 33/0842
USPC ...................... 315/185 R, 291, 308
See application file for complete search history.

(56) References Cited

U.S. PATENT DOCUMENTS

| | | | |
|---|---|---|---|
| 5,790,395 A | 8/1998 | Hagen | |
| 8,437,149 B2 * | 5/2013 | Bancroft | H02M 3/3388 363/16 |

(Continued)

FOREIGN PATENT DOCUMENTS

WO 2014/013407 A1 1/2014

OTHER PUBLICATIONS

Suresh Hariharan, "Application Note 5372: MR16 LED Driver Makes MR16 LED Lamps Compatible with Most Electronic Transformers," Mar. 27, 2013, pp. 1-12, Maxim Integrated Products, Inc.

(Continued)

*Primary Examiner* — Thuy Vinh Tran
(74) *Attorney, Agent, or Firm* — Seed IP Law Group PLLC

(57) ABSTRACT

A biasing and driving circuit for an electric load, having an input adapted to receive an a.c. input voltage and an output adapted to supply a d.c. output voltage, comprising: a voltage-regulator device, having a feedback input terminal configured to receive a sensing voltage that is a function of a supply current that flows through the electric load and regulating, on the basis of the sensing voltage received, the supply current; a resistive sensing element, operatively coupled to the feedback input, configured to receive the supply current and generate the sensing voltage as a function of the supply current; a resistor coupled to the feedback input; and an auxiliary biasing circuit adapted to receive the a.c. input voltage and inject through the resistor an a.c. auxiliary biasing current that varies in a way inversely proportional to the input voltage.

21 Claims, 11 Drawing Sheets

(56) References Cited

U.S. PATENT DOCUMENTS

2009/0302779 A1* 12/2009 McKinney ......... H05B 33/0818
                                                                315/294
2010/0302818 A1   12/2010 Chang et al.

OTHER PUBLICATIONS

"Simple LED Driver for MR16 and AR111 Applications," TPS92560, Dec. 2012, pp. 1-21, Texas Instruments Incorporated.

"A monolithic step-down current source with dimming capability," LED5000: Datasheet—production data, Sep. 2014, pp. 1-55, STMicroelectronics.

Wang et al., "Using Repetitive Control for THD Reduction over Wide Load Range for Boost Digital PFC Converters," IEEE International Symposium on Industrial Electronics (ISIE), Hangzhou, China, May 28-31, 2012, pp. 576-581.

* cited by examiner

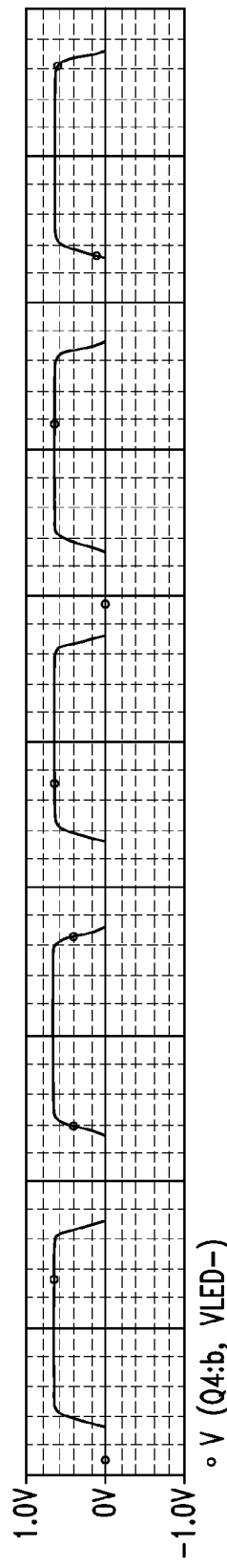
FIG. 5F ($V_{BE}$ of Q1)
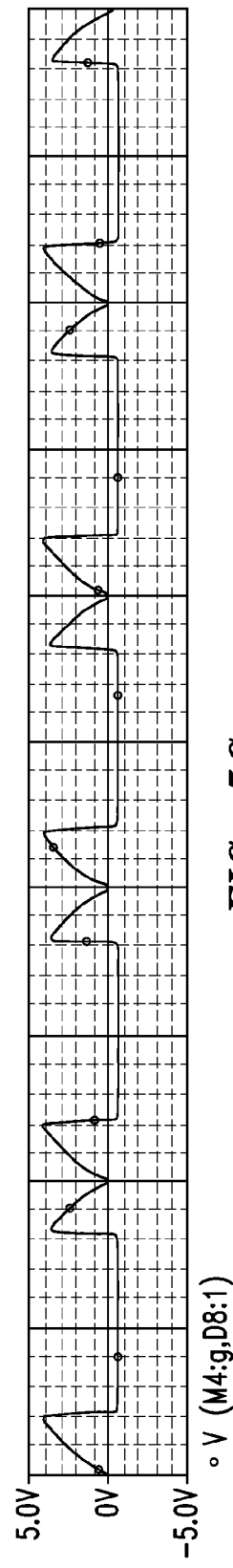
FIG. 5G ($V_{GS}$ of M4)
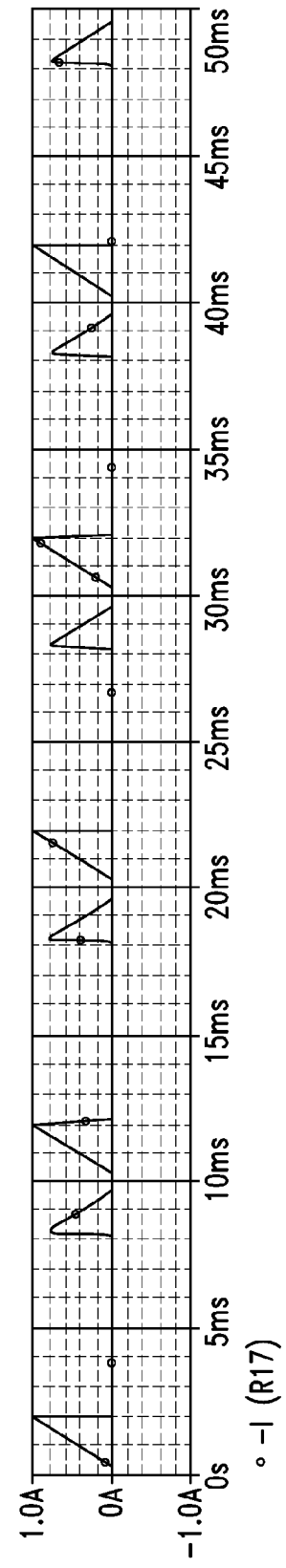
FIG. 5H ($I_{RCURR\_HOLD}$)

BIASING AND DRIVING CIRCUIT, BASED ON A FEEDBACK VOLTAGE REGULATOR, FOR AN ELECTRIC LOAD

BACKGROUND

1. Technical Field

The present disclosure relates to a biasing and driving circuit, based on a feedback voltage regulator, in particular a switching-mode power supply (SMPS), for an electric load.

2. Description of the Related Art

FIG. 1A shows a driving circuit for light-emitting diodes (LEDs), which is designated by the reference 1 and in particular includes a voltage regulator 5 of an SMPS type configured to operate as constant-current source and adapted to supply a string of LEDs 2 (illustrated in FIG. 1A is just one LED 2, coupled between output supply pins, $V_{LED}^+$ and $V_{LED}^-$). The SMPS device 5 is of a per se known type, for example described in the datasheet of the product "LED5000" manufactured by STMicroelectronics, entitled "LED5000—A monolithic step-down current source with dimming capability", September, 2014.

The SMPS device 5 is operatively coupled to input supply terminals $V_{IN}^+$ and $V_{IN}^-$, present between which is a voltage $V_{IN}$, for example generated by an electronic transformer (not illustrated).

The SMPS device 5 has, in a known way, a plurality of operating terminals, and in particular: a supply terminal 1a, adapted to receive an input voltage $V_{IN}$, having a value, for example between 5.5 and 48 V; a reference terminal 1b, which forms a reference-voltage terminal; a feedback input terminal 1c, which is coupled to the sensing resistor 4 and constitutes the inverting input of an error amplifier internal to the SMPS device 5 (regulation terminal); a terminal 1d, which provides a power-supply connection for the internal analog circuitry; a terminal 1e, which forms, together with the reference terminal 1b and with the error amplifier, the output of a regulation loop internal to the SMPS device 5; and a terminal 1f that implements an output terminal for switching the SMPS device 5 and is coupled to the terminal 1d via a capacitor 8.

As illustrated in greater detail in FIG. 1B, the regulation loop internal to the SMPS device 5 includes the voltage-error amplifier 3, which implements a first stage of the regulation loop. In particular, the voltage-error amplifier 3 is a transconductance operational amplifier, the non-inverting input of which is connected to a voltage reference $V_{REF}$ internal to the SMPS device 5 (variation of which is typically between 194 and 206 mV; in particular, a typical value of 200 mV in closed loop is considered in what follows), whereas the inverting input terminal is connected to a sensing resistor 4. The inverting input terminal of the voltage-error amplifier 3 forms a feedback input terminal 1c of the SMPS device 5. The voltage-error amplifier 3 generates, on the terminal 1c, a control signal $V_{CONTROL}$, which is supplied to the non-inverting input of a PWM comparator 7, which, in turn, drives, on the terminal 1f, the high-side (HS) switch of a DC-DC converter 9'. A current detector 9'' detects the current circulating in the high-side (HS) switch and supplies the value detected (transduced) to the inverting input of the PWM comparator.

The DC-DC converter 9' generates at output a regulation signal $V_{SW}$ having a duty cycle such as to regulate the supply current ($I_{LED}$) appropriately.

In other words, present between the terminal 1a and the terminal 1f is an SMPS converter, wherein the non-inverting input of the error amplifier acts on the terminal 1c, and the output of the amplifier acts on the terminal 1e.

Thus, with reference to FIG. 1A, the SMPS regulator 5, the inductor 6 and the diode 11 form, for example, a DC-DC converter topology of a boost type.

The regulated current level supplied at output from the SMPS device 5 is thus set, or regulated, on the basis of the current that flows through the sensing resistor 4, across which, according to what has been said, there may be noted a voltage drop equal to the reference $V_{REF}$ of 200 mV. The resistance value $R_S$ of the sensing resistor 4 is consequently given by $R_S=(200\ mV)/I_{LED}$, where $I_{LED}$ is the current that flows through the string of LEDs 2. In a case provided by way of example, where $L_{LED}=1A$, we have $R_S=0.2\ \Omega$.

Coupled to the terminal 1c of the SMPS device 5 a resistor 26 is further present, having a resistance $R_1$ of approximately 10 kΩ. Optionally, it is possible to insert a Zener diode (not illustrated) in parallel to the resistor 26 so that the resistor 26 and the Zener diode implement a protection from overvoltages. The effect of the resistor 26 is negligible in so far as the current at input to the terminal 1c is substantially zero, or negligible (at the most a few tens of nanoamps).

Furthermore, coupled to the terminal 1e are a resistor 13 and a capacitor 15, connected together in series, which have the function of implementing a compensation network for the regulation loop. By way of example, the resistor 13 has a resistance of 22 kΩ and the capacitor 15 has a capacitance of 10 nF.

It is evident that the SMPS device 5 may include further input/output terminals, for implementing further functions, as required.

The input capacitor 10, coupled to respective supply inputs of the SMPS device 5, is configured to withstand the maximum operating input voltage and the maximum mean square value of the current. Capacitors adapted for this purpose, available for use for a wide range of currents, are, for example, electrolytic capacitors, ceramic capacitors, tantalum capacitors.

An output capacitor 12, coupled between the input $V_{IN}^+$ and the reference terminal 1b, has the function of filtering the current ripple of the diode 11, which, given a specific application and an output current, depends upon the value of inductance of the inductor 6. In general, if $\Delta I_L$ is the current ripple of the inductor 6 and $I_L$ the average current that flows through the inductor, the value of inductance L is chosen in such a way that $(\Delta I_L/I_L)<0.5$.

The driving circuit 1 may be coupled, as has been said, to an electronic transformer, which generates the input voltage $V_{IN}$. Electronic transformers of a known type are typically based on a self-oscillating circuit and, to operate properly, require a load of a resistive type. In other words, the driving circuit 1 must be seen, by an electronic transformer coupled to the inputs $V_{IN}^+$ and $V_{IN}^-$, as a resistive load. However, it is known that an SMPS device, for example of the type illustrated in FIG. 1A and described with reference to that figure, in the absence of further arrangements, is seen as a load with negative impedance and thus is not optimized to be coupled to the output of an electronic transformer that requires a resistive load for its proper operation.

To overcome this drawback, it is known in the art to use a current control of the input signal. See, for example, Application Note 5372, "MR16 LED Driver Makes MR16 LED Lamps Compatible with Most Electronic Transformers" by Suresh Hariharan, Mar. 27, 2013, Maxim Integrated Products. A similar solution is discussed in the datasheet of the product MAX16840, manufactured by Maxim Integrated Products, Inc., "LED Driver with Integrated MOSFET for MR16 and Other 12V AC Input Lamps".

In this technical solution, represented schematically in FIG. 2, the voltage on the sensing resistor 4 is regulated at each switching cycle, exploiting a reference circuit 18 external to the SMPS device 5, adapted to supply a voltage signal $V_{REFI}$ to a further input terminal 1g of the SMPS device 5, for the purpose of setting the input current level by appropriately controlling the voltage on the terminal 1c. In other words, when the voltage $V_{REFI}$ present on the terminal 1g drops below a certain threshold value, the input current (voltage on the resistor 4) is regulated proportionally to the value assumed by the voltage $V_{REFI}$ on the terminal 1g. Instead, when the voltage $V_{REFI}$ present on the terminal 1g exceeds the threshold value, then the input current (voltage on the resistor 4) is set at a predefined fixed value. The voltage on the sensing resistor 4 is thus regulated as a function of the voltage $V_{REFI}$ received at input on the terminal 1g, which is in turn a function of the input voltage $V_{IN}$. This type of modulation of the voltage on the terminal 1c enables simulation of a resistive load, seen by an electronic transformer coupled to the input of the driving circuit 1 of FIG. 2. However, this implementation requires a terminal of the device 5 (terminal 1g) explicitly dedicated to this purpose, a circuitry internal to the device 5 adapted for regulating the voltage on the terminal 1c as a function of the reference on the terminal 1g, as well as, at the same time, an external circuit for generating the reference signal to be supplied to the terminal 1g. In other words, this solution is not applicable to any generic SMPS device; the latter, instead, must be purposely built.

Other known solutions require provision of dedicated dual-stage converters, with consequent implementation of double inductive components, which increase the costs and size.

There is thus a need to provide a driving circuit for a voltage regulator, for example of an SMPS type, that is adapted to emulate a resistive load when seen from the input terminals $V_{IN}^+$ and $V_{IN}^-$, is such as to increase the power factor, with lower production costs and reduced occupation of space, and is able to operate with any generic voltage regulator.

BRIEF SUMMARY

An aim of the present disclosure is to provide a biasing and driving circuit, based on a voltage-regulator device, for an electric load, which overcomes problems of the known art and may achieve the aforementioned advantages.

Provided according to the present disclosure is a biasing and driving circuit, based on an SMPS device, of an electric load.

In one embodiment, a biasing and driving circuit for an electric load has input terminals adapted to receive an a.c. input voltage and output terminals adapted to supply a d.c. output voltage to the electric load. A voltage regulator with a feedback loop has a feedback input terminal configured to receive a sensing voltage that is a function of a supply current that flows through the electric load and which regulates, on the basis of the sensing voltage, the supply current. A resistive sensing element is operatively coupled to the feedback input and configured to receive the supply current and generate the sensing voltage as a function of the supply current. A current transducer, of a resistive type, is coupled to the feedback input. An auxiliary biasing circuit is adapted to receive the a.c. input voltage and to inject through the current transducer an a.c. auxiliary biasing current that varies in a way inversely proportional to the a.c. input voltage.

BRIEF DESCRIPTION OF THE SEVERAL VIEWS OF THE DRAWINGS

For a better understanding of the present disclosure, some embodiments thereof will now be described, purely by way of non-limiting example and with reference to the annexed drawings, wherein:

FIGS. 5A-5H show electrical signals during operating steps of the biasing and driving circuits of FIGS. 4 and 4a;

DETAILED DESCRIPTION

Figure 1A:
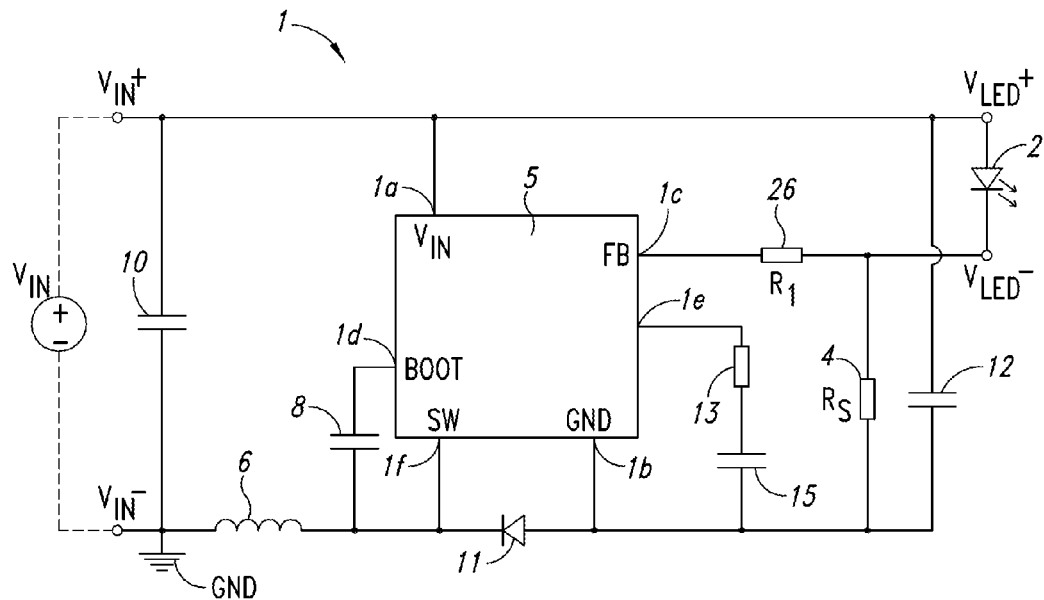
FIG. 1A illustrates a biasing and driving circuit for a string of LEDs, according to an embodiment of a known type.
Figure 3:
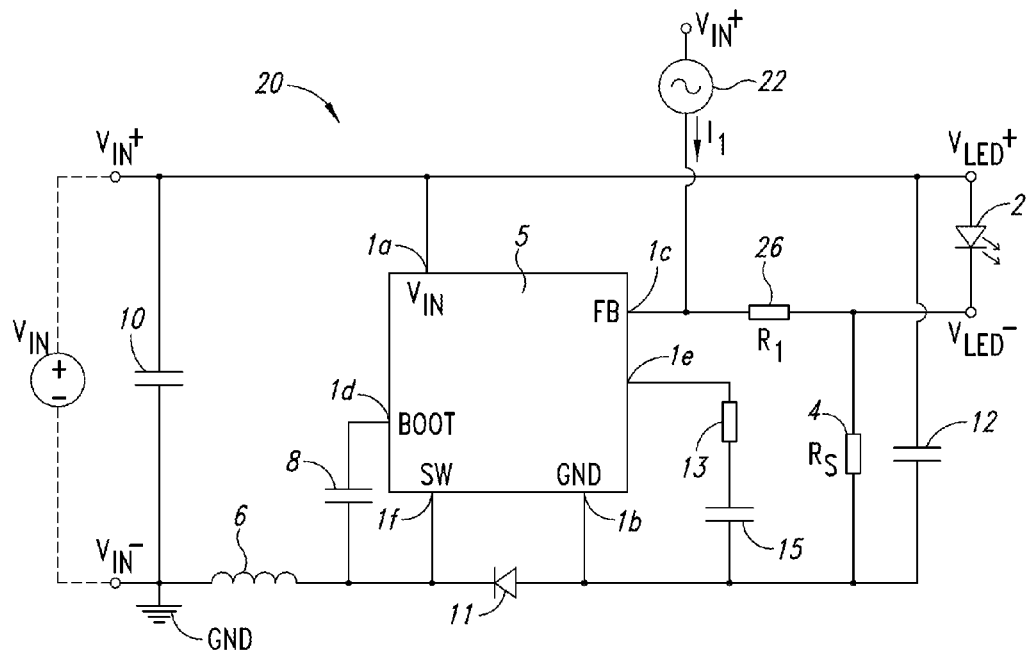
FIG. 3 illustrates a biasing and driving circuit for a string of LEDs, according to one embodiment of the present disclosure.

FIG. 3 shows, according to an embodiment of the present disclosure, a biasing and driving circuit 20 for a string of LEDs, comprising a switching-mode power-supply (SMPS) device 5, configured to operate as constant-current source and adapted to supply the string of LEDs 2 (illustrated by way of example in FIG. 3 is just one LED 2). Elements of the driving circuit 20 that are common to those of the driving circuit 1 of FIG. 1A are designated by the same reference numbers and are not described any further.

Figure 1B:
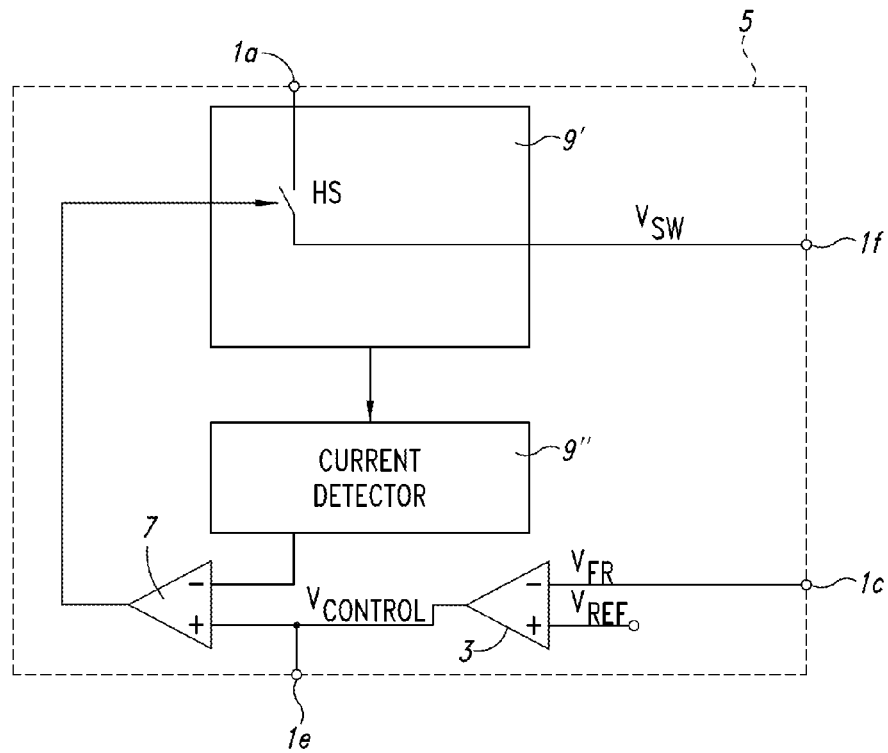
FIG. 1B illustrates a regulation loop internal to an SMPS device that forms part of the biasing and driving circuit of FIG. 1A.
Figure 2:
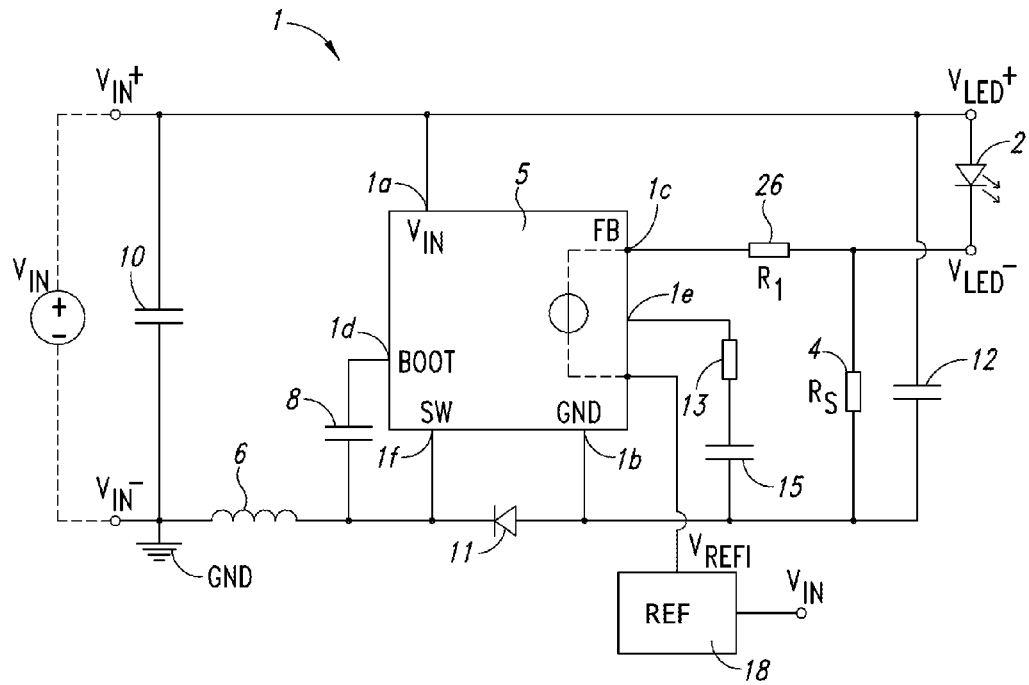
FIG. 2 illustrates a biasing and driving circuit for a string of LEDs, according to a further embodiment of a known type.

The driving circuit 20 further includes a current generator 22, operatively coupled to the terminal 1c of the SMPS device 5, configured to supply on the terminal 1c of the SMPS device 5 a current signal $I_1$ of an alternating current (a.c.) type, in particular a sinusoidal signal. According to one aspect of the present disclosure, the bandwidth of the regulation loop internal to the SMPS device 5, illustrated in FIG. 1B, is greater than the maximum frequency of the current signal $I_1$, for example greater by one or more orders of magnitude. For instance, the bandwidth of the regulation loop of FIG. 1B is 10 kHz, and the frequency of the current signal $I_1$ (e.g., a sinusoidal signal) is 100 Hz.

The resistor 26, having a resistance $R_1$ with a value of approximately 10 kΩ, is adapted to receive the current signal $I_1$, modulating the voltage drop on the sensing resistor 4. The output terminal of the current generator $I_1$ is coupled between the terminal 1c and the resistor 26, and the reference terminal of the current generator, instead, is coupled to the input terminal $V_{IN}^+$. The terminal 1c is a high-impedance terminal, and consequently (to a first approximation) the current signal $I_1$ flows entirely through the resistor 26 and not towards the terminal 1c.

The current $I_{LED}$ that flows through the sensing resistor 4 is, thus, given by:

$$I_{LED} = \frac{V_{FB} - (I_1 \cdot R_1)}{R_S}$$

where $V_{FB}$ is the feedback voltage present on the terminal 1c in closed loop (in the example considered previously, equal to 200 mV) and $I_1 \cdot R_1$ is the voltage contribution generated by the resistor 26 in the presence of the current signal $I_1$ supplied by the generator 22 ($R_1$ is here chosen by way of example equal to 10 kΩ). In other words, $V_{FB}-(I_1 \cdot R_1)$ is the voltage across the sensing resistor 4.

From the foregoing equation, it is evident that, in the absence of the current signal $I_1$ (i.e., $I_1=0$ A), the current $I_{LED}=V_{FB}/R_S$ circulating in the string of LEDs 2 and in the sensing resistor 4 is determined only by the internal reference $V_{REF}$ (reference of the error amplifier on the feedback terminal 1c of the SMPS regulator 5). Instead, in the presence of the current signal $I_1$, the current circulating in the LEDs 2 depends upon the voltage drop across the resistor 26. In particular, for example with $I_1=20$ μA, i.e., $I_1 \cdot R_1=200$ mV, the current $I_{LED}=(V_{FB}-(I_1 \cdot R_1))/R_S$ circulating in the string of LEDs 2 and in the sensing resistor 4 is zero.

The voltage drop on the resistor 4 as a result of the current signal $I_1$ is considered negligible.

By what has been said herein, it may be noted that, in the absence of the current signal $I_1$, the current $I_{LED}$ has a substantially constant value, and the load seen by an electronic transformer, in these conditions, has a negative impedance.

Instead, in the presence of the current signal $I_1$, the current circulating in the LEDs 2 that traverses the sensing resistance 4 is modulated in such a way that the load seen by the electronic transformer resembles a resistive load.

The present applicant has found that, to emulate a resistive load, it is expedient for the current signal $I_1$ to assume values inversely proportional to the respective values assumed by the input signal $V_{IN}$. In other words, the current signal $I_1$ has a time plot 180° phase-shifted with respect to the time plot of the input voltage signal $V_{IN}$.

Figure 4:
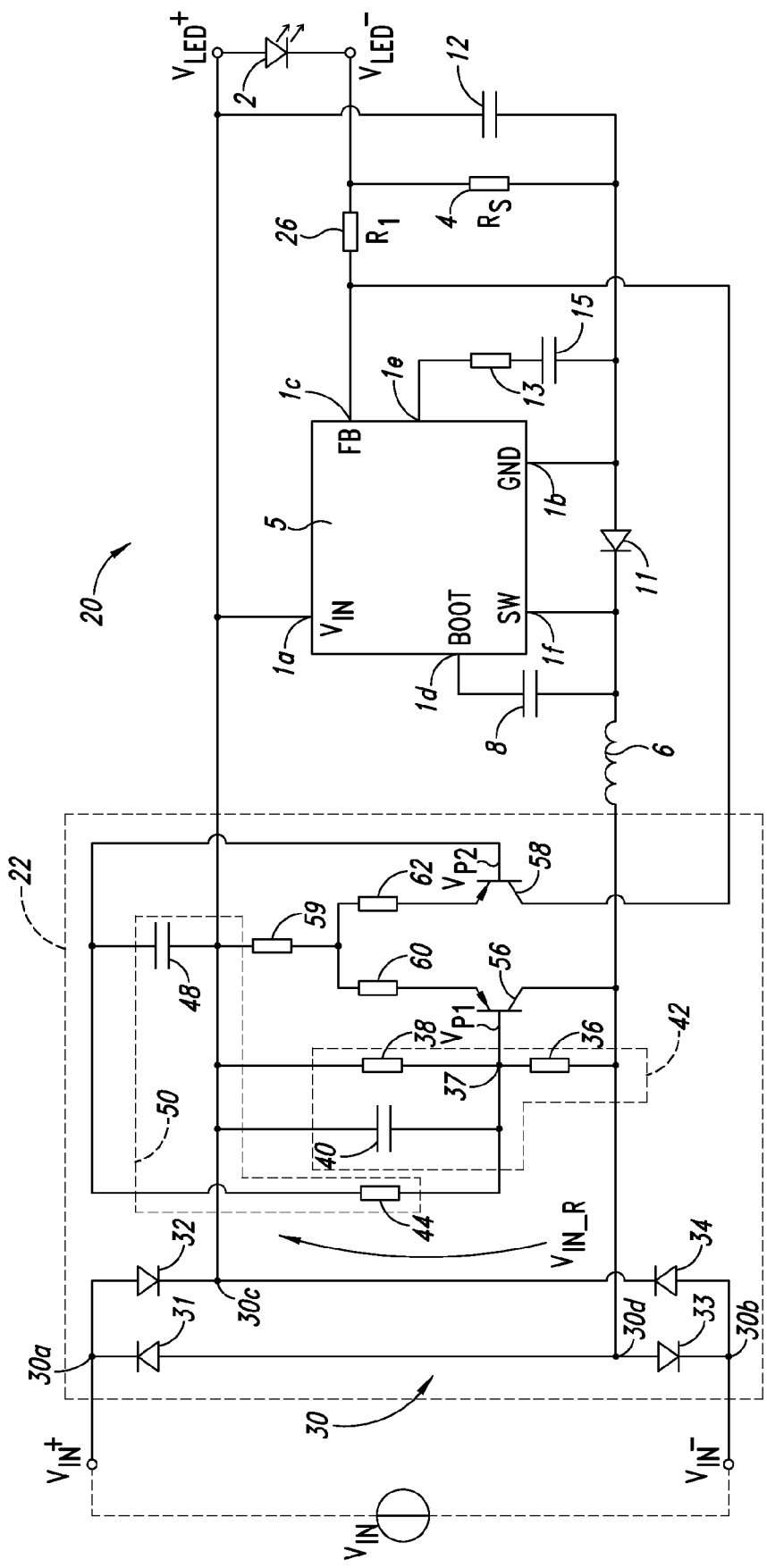
FIG. 4 illustrates a circuit implementation of the biasing and driving circuit of FIG. 3, according to an embodiment of the present disclosure.

The current signal $I_1$ that implements what has been described above is generated by a signal-generating circuit illustrated in FIG. 4.

Figure 3A:
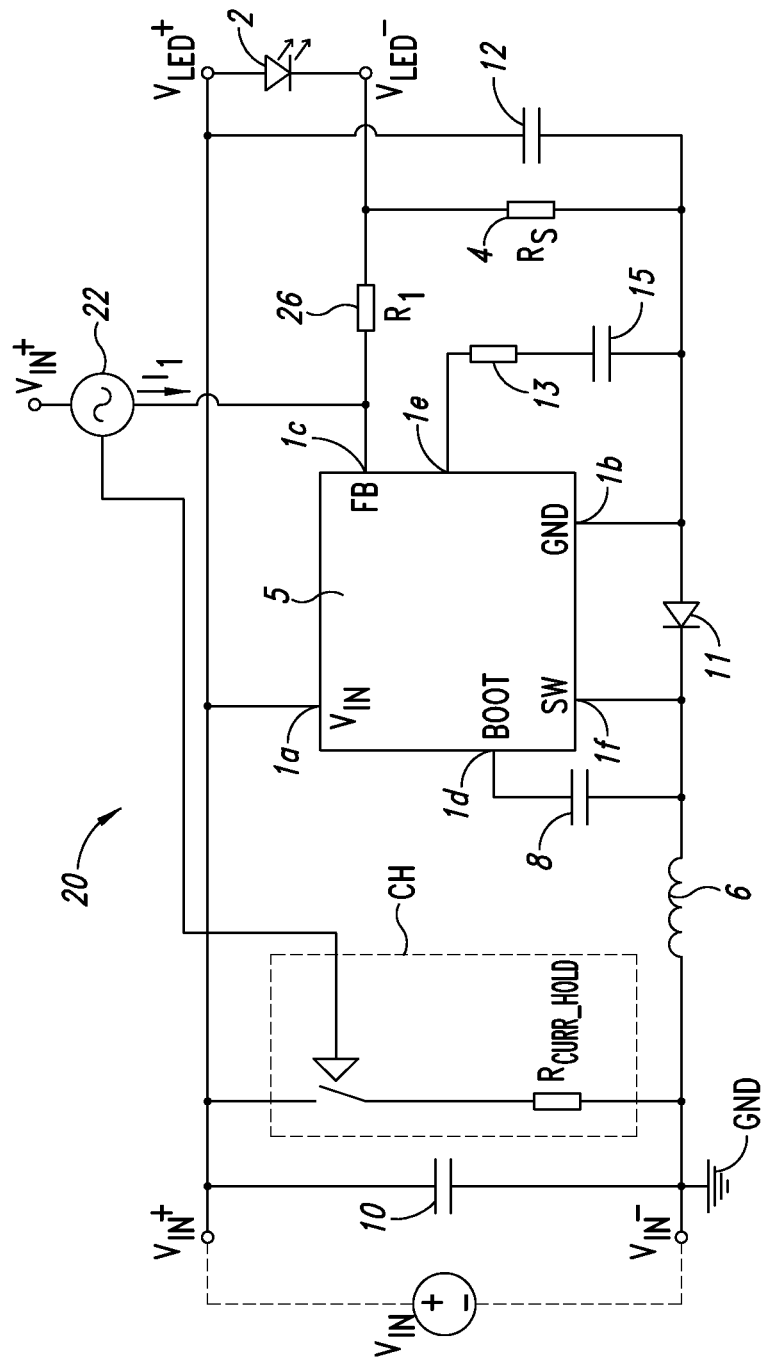
FIG. 3a illustrates the circuit of FIG. 3 with an additional biasing circuit that improves the behavior of the circuit of FIG. 3 according to another embodiment of the present disclosure.

In FIG. 3a, an additional biasing circuit named a current holder circuit (CH) is shown. This circuit CH connects a resistor $R_{CURR\_HOLD}$ between the terminal VIN+ and VIN− when the current I1 from current generator 22 is higher than a certain value, so that the electronic transformer providing the voltage $V_{IN}$ is loaded also when the current requested by the voltage regulator 5 is very low (i.e. when a rectified input voltage VIN_R (see FIG. 4) is at its minimum and current I1 is at its highest value). The present applicant has found that the current holder circuit CH further improves the emulation of a resistive load, since it loads the electronic transformer providing the voltage $V_{IN}$ with an adequate resistor when the current signal I1 is at its maximum, i.e. when the voltage regulator 5 of the SMPS type is absorbing zero current from the electronic transformer. Moreover, the current holder circuit CH sustains the electronic transformer switching activity during the light load phase, so that the current generator 22 is properly biased on the beginning of every power line cycle.

With reference to FIG. 4, the generator 22 includes a rectifier input stage 30, for example obtained by a diode bridge 31-34, configured to receive the input voltage $V_{IN}$ (a.c. signal) on its own input terminals 30a and 30b, and generate a rectified input voltage $V_{IN\_R}$ (i.e., a direct current (d.c.) signal) on its own output terminals 30c and 30d.

Furthermore, the generator 22 includes a division stage 42, which is coupled between the output terminals 30c, 30d of the rectifier 30 and is configured to acquire the rectified input voltage $V_{IN\_R}$ and generate a first intermediate operating voltage $V_{P1}$ that is a function of the rectified input voltage $V_{IN\_R}$ but has a reduced maximum amplitude, in particular having a value such as to drive a first transistor 56 (operation of which is described more fully hereinafter) into the on state. For this purpose, the division stage 42 includes a resistive voltage divider formed by resistors 36, 38 connected together in series between the output terminals 30c, 30d of the rectifier 30, and a capacitor 40, which is electrically coupled in parallel to the resistor 38 and has the function of providing a filter for removal of the high frequencies (e.g., frequencies higher than 60-100 kHz). The first intermediate operating voltage $V_{P1}$, which biases the control terminal (gate) of the first transistor 56, is picked up on a node 37, between the resistor 36 and the resistor 38.

By way of example, the resistor 36 has a resistance of 10 kΩ, the resistor 38 has a resistance of 2.4 kΩ, and the capacitor 40 has a capacitance of 68 nF.

The generator 22 further includes an integration stage 50, configured to receive the first intermediate operating voltage $V_{P1}$ and generate a second intermediate operating voltage $V_{P2}$ that is the integral of the first intermediate operating voltage $V_{P1}$. The second intermediate operating voltage $V_{P2}$ is used for biasing the control terminal (base) of a second transistor 58 (operation of which is described more fully hereinafter). For this purpose, the integration stage 50 includes: a resistor 44, electrically coupled between the node 37 and the control terminal of the second transistor 58 (i.e., electrically coupled to the output terminal 30d of the rectifier 30 via the resistor 36); and a capacitor 48 electrically coupled between the control terminal of the second transistor 58 and the output terminal 30c of the rectifier 30.

By way of example, the resistor 44 has a resistance of 100 kΩ, and the capacitor 48 has a capacitance of 1 μF.

The transistors 56 and 58 are, in particular, BJTs of a PNP type that are the same as one another, and implement a differential pair, of a per se known type. Both the emitter terminal of the transistor 56 and the emitter terminal of the transistor 58 are electrically coupled to the output terminal 30c of the rectifier 30 by a tail resistor 59, having for example a resistance of 43 kΩ. Furthermore, each transistor 56, 58 has a respective degeneration resistor 60, 62 coupled between its own emitter terminal and the tail resistor 59. The degeneration resistors 60, 62 have the same value of resistance, for example of 30 kΩ.

The collector terminal of the transistor 56 is, for example, electrically coupled to the output terminal 30d of the rectifier 30, whereas the collector terminal of the transistor 58 is electrically coupled between the feedback input terminal 1c of the SMPS device 5 and the resistor 26 (on the node designated by the reference number 70). A Zener diode (not illustrated) may likewise be coupled in parallel to the resistor 26 for providing protection from overvoltages.

FIGS. 5A-5E show, using the same time scale, voltage/current signals at input to, and generated by, the generator 22 of FIG. 4.

Figure 5A:
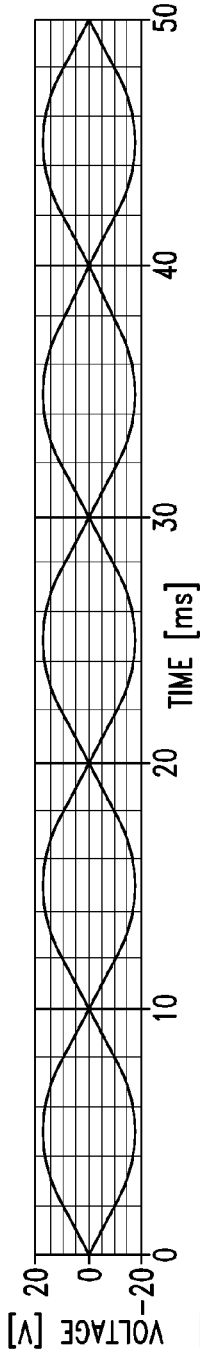
Figure 5B:
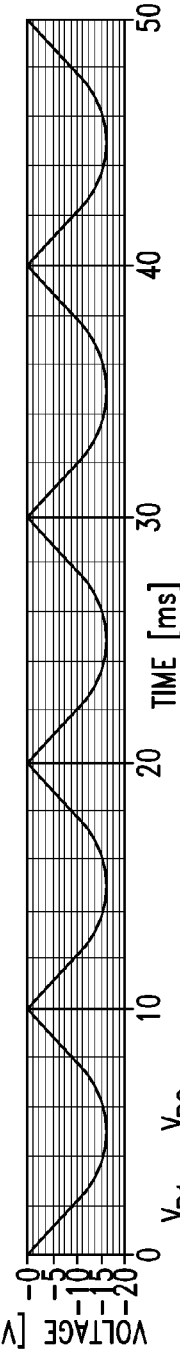

FIG. 5A illustrates by way of example the envelope of the input signal $V_{IN}$, generated by the electronic transformer, whereas FIG. 5B illustrates, by way of example, the envelope of the rectified input signal $V_{IN\_R}$ referred to the node 30c, present on the output of the rectifier 30.

Figure 5C:
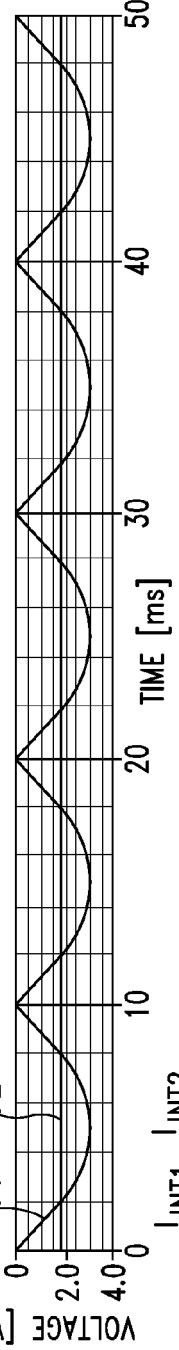

FIG. 5C illustrates the control signals of the transistors 56 and 58 referred to the node 30c. In particular, it may be noted that the plot of the first intermediate operating voltage $V_{P1}$ follows the plot of the envelope of the rectified input signal $V_{IN\_R}$ with a peak value, in modulus, lower than that of the rectified input signal $V_{IN\_R}$ (in this example, it ranges between 0V and −3V approximately). The second intermediate operating voltage $V_{P2}$ is, as has been said, the integral of the first intermediate operating voltage $V_{P1}$ and, in this example, assumes values close to −2V.

With reference to FIG. 5C, there may be noted two operating conditions of the differential pair. In a first operating condition, in which the rectified input voltage $V_{IN\_R}$ has, in modulus, a maximum value, the differential stage does not inject current into the node 70; instead, when the rectified input voltage $V_{IN\_R}$ has, in modulus, a minimum value, the differential stage injects into the node 70 the current that flows through the transistor 58. According to one embodiment, this current is the current $I_1$ identified previously, having a value, in modulus, of approximately 20 μA.

Figure 5D:
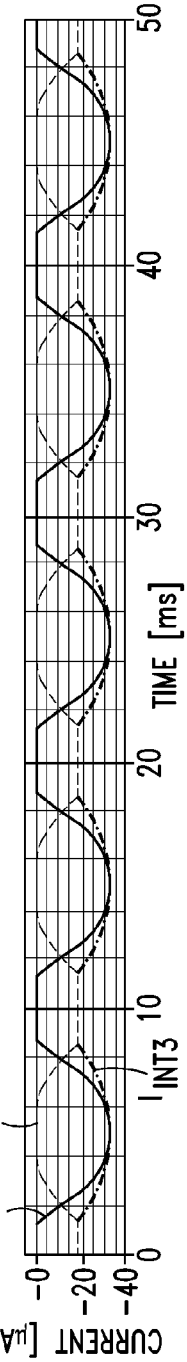

FIG. 5D illustrates the plot of the currents through the transistor 56 (intermediate current signal $I_{INT1}$) and through the transistor 58 (intermediate current signal $I_{INT2}$ corresponding to the current signal $I_1$ of FIG. 3). The sum of $I_{INT1}$ and $I_{INT2}$ is equal to the current circulating in the resistor 59 (signal $I_{INT3}$). As may be noted, when the rectified input voltage $V_{IN\_R}$ has a maximum value (in modulus), the current signal $I_1=I_{INT2}$ is minimum and approximately to 0 A. Instead, when the rectified input voltage $V_{IN\_R}$ has a minimum value (in modulus), the transistor 56 is off ($V_{P1}=0$ V), and the transistor 58 behaves like a current generator that generates a current $I_1$ equal to approximately −20 μA, injecting into the node 70 a current $I_1$ equal, in modulus, to approximately 20 μA, and thus there is a voltage drop of 200 mV on the resistor 26.

It is evident that, in the transitions of the rectified input voltage $V_{IN\_R}$ between the maximum value and the minimum value, the current $I_1$ injected into the node 70 assumes intermediate values, but always inversely proportional to the value assumed by the rectified input voltage $V_{IN\_R}$.

Figure 5E:
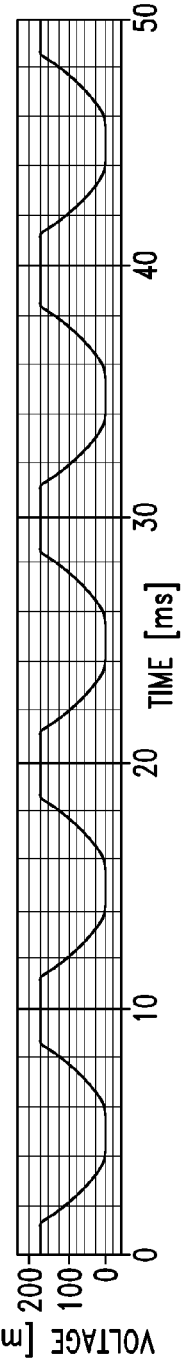

FIG. 5E illustrates the voltage drop on the resistor 26, proportional to the values assumed by the current $I_1$. Assuming the voltage on the node 1c set by the regulation loop of the SMPS converter as being fixed, it is evident that the current that flows in the sensing resistor 4 follows, in a directly proportional way, the variations of the input voltage $V_{IN}$.

Figure 4A:
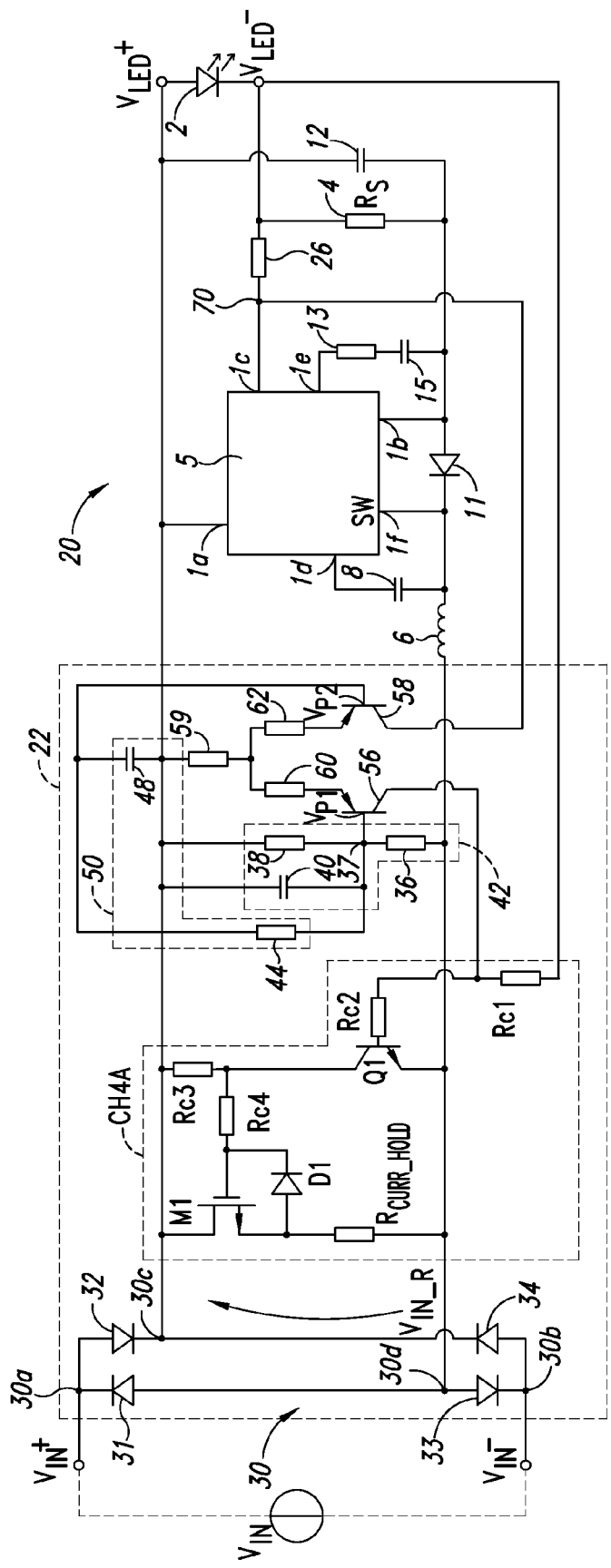
FIG. 4a illustrates a circuit implementation of the biasing and driving circuit of FIG. 3a, according to an embodiment of the present disclosure.

FIG. 4a shows a further embodiment of the present disclosure including the same generator 22 of FIG. 4 with the addition of a possible implementation of the Current holder circuit CH of FIG. 3a, which is designated CH4A in the embodiment of FIG. 4a. This circuit CH4A includes a resistor Rc1, a resistor Rc2, a resistor Rc3, a resistor Rc4, a BJT of NPN polarity Q1, a diode D1 and a MOSFET of N polarity M1, and a resistor $R_{CURR\_HOLD}$.

By way of example, the resistor Rc1 has a resistance of 100 kΩ, the resistor Rc2 has a resistance of 10 Ω, the resistor Rc3 has a resistance of 10 kΩ, the resistor Rc4 has a resistance of 33 kΩ and the resistor RCURR_HOLD has a resistance of 5.1 Ω.

In particular, in the operating condition of the differential pair 56, 58, when 56 is off (i.e. $V_{IN\_R}$ is at its minimum), the BJT Q1 has no current injected in its base and therefore there is no current flowing in the collector of Q1 and in the resistor Rc3. As a consequence, the MOSFET M1 works with the gate equal to $V_{IN\_R}$ and connects with a low impedance the drain of M1 to $V_{IN\_R}$. The current flowing in the resistor RCURR_HOLD can be calculated according to the equation $$I_{RCURR\_HOLD} = \frac{V_{IN\_R}}{R_{CURR\_HOLD} + R_{DSON,M1}}$$

Otherwise, in the operating condition of the differential pair 56, 58 when 56 is on (i.e. $V_{IN\_R}$ is at its maximum), the base of Q1 is biased by the current flowing in 56. The current flowing in the resistor Rc3 through (the collector of Q1) turns off M1. As a result the current flowing in the resistor RCURR_HOLD is equal to zero.

The behavior of the current generator 22 and current holder circuit CH4A described with reference to FIG. 4a can be seen in FIGS. 5F-5H.

When VP2 is higher than VP1 the base of transistor Q1 is positively biased so that there is current flowing in RC3 so that VGS of M1 goes below the transistor threshold voltage, thus disconnecting RCURR_HOLD from the electronic transformer. In this condition no resistive load is necessary since the SMPS 5 is absorbing significant current from the electronic transformer. Otherwise, when VP2 is lower than VP1, the current IINT1 is reducing down to the condition when the base of Q1 is no more positively biased. At this point, the gate to source voltage of transistor M1 goes above the transistor threshold voltage, thus connecting the resistor RCURR_HOLD between the two output terminals of the electronic transformer. As a consequence, during this phase, a sinusoidal current is absorbed from the electronic transformer.

The current holder circuit CH4A described above adds a resistive load to the electronic transformer when the current $I_{INT2}$ is at its maximum (i.e. when VIN_R is at its minimum). In this biasing condition, the SMPS is absorbing no current from the electronic transformer, and therefore, the connection of this resistor improves the resistive emulation of the circuit 22. Moreover, the current holder sustains the switching activity of the electronic transformer at the beginning of every power line cycle, so that the current generator 22 works properly in every power line cycle.

Figure 6:
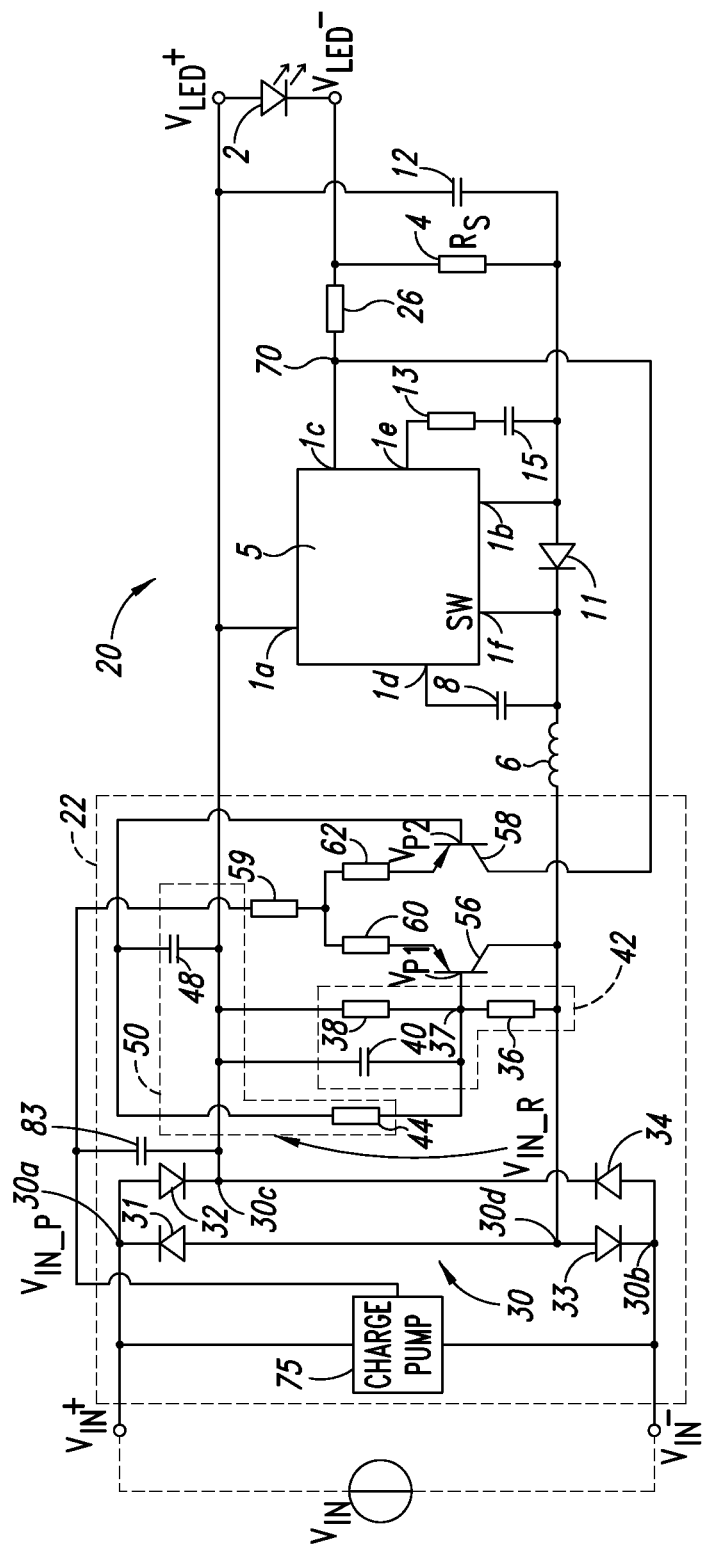
FIG. 6 illustrates a further circuit implementation of the biasing and driving circuit of FIG. 3, according to a further embodiment of the present disclosure.

FIG. 6 shows a further embodiment of the present disclosure. Elements of FIG. 6 common to elements appearing in FIG. 4, and described with reference to this figure, are designated by the same reference numbers and are not described any further.

According to the embodiment of FIG. 6, the generator 22 further includes a stage for biasing the tail resistor 59 of the differential stage. For instance, said biasing is obtained by a charge pump 75 operatively coupled to the electronic transformer for receiving the input signal $V_{IN}$. The charge pump 75 thus receives the input signal $V_{IN}$ and supplies a biasing signal $V_{IN\_P}$ at input to the tail resistor 59, and is likewise electrically coupled to the node 30c via a capacitor 83 (e.g., with a capacitance of 220 nF). According to one embodiment, the tail resistor 59 of the differential stage is biased with a voltage $V_{IN\_P}$ having a value, in modulus, of approximately 5 V (in this example, $V_{IN\_P}=-5$ V).

The embodiment of FIG. 6 has the advantage of maintaining constant the current circulating in the resistor 59 as the input signal varies and thus the linearity of the response of the current generator 22 increases. As a consequence, the resistive emulation of the current absorbed by the SMPS 5 is improved, and the compatibility between the electronic transformer and the SMPS is increased.

Figure 6A:
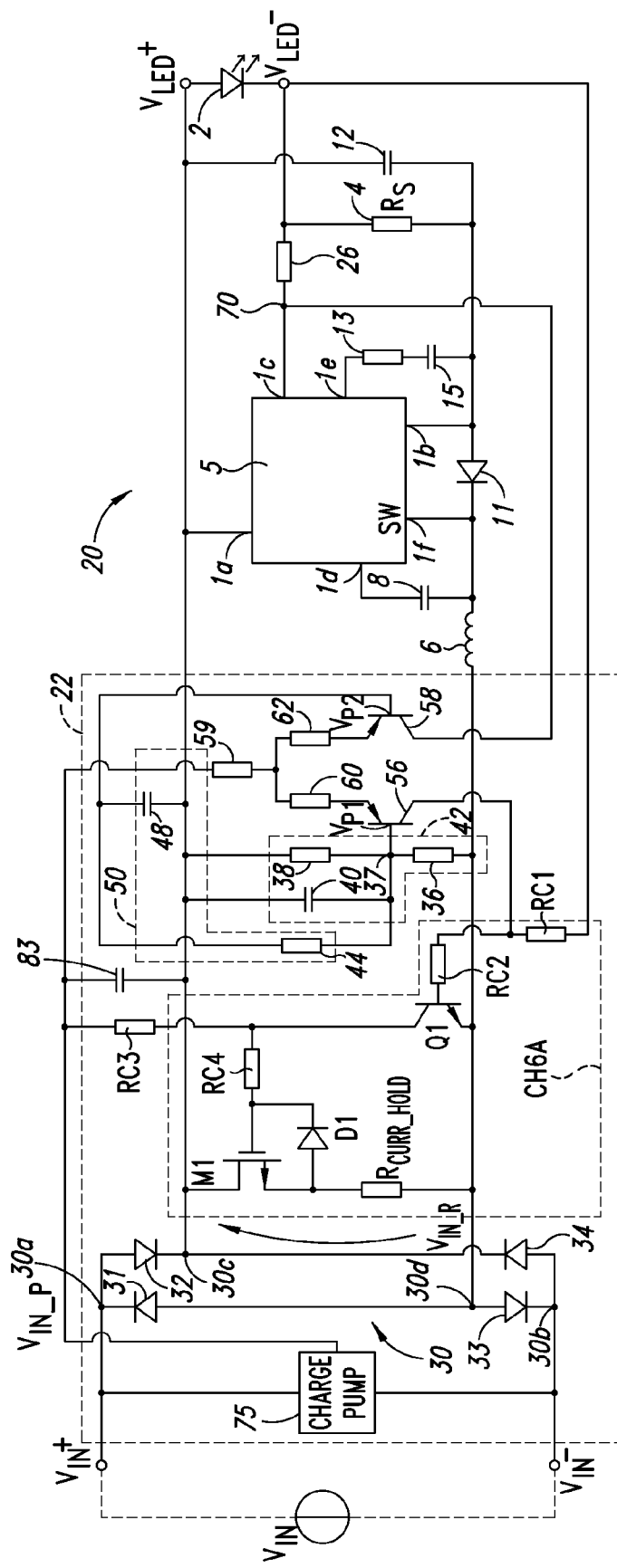
FIG. 6a illustrates a further circuit implementation of the biasing and driving circuit of FIG. 3a, according to a further embodiment of the present disclosure.

FIG. 6a illustrates a further circuit implementation of the biasing and driving circuitry of FIG. 3a including the current generator 22 of FIG. 6 and another embodiment of the current holder circuit CH of FIG. 3a, which is designated CH6A in FIG. 6a according to yet another embodiment of the present disclosure. The structure of the current holder circuit CH6A is similar to the structure of the current holder circuit CH4A of FIG. 4A except the resistor RC3 is coupled to the charge pump 75 to receive the biasing signal $V_{IN\_P}$. The operation of the current holder circuit CH6A is also similar to that of the current holder circuit CH4A of FIG. 4A, and will be understood by those skilled in the art in view of the description of the circuit CH4A above. Briefly, when the transistor 56 of the differential pair 56, 58 is turned OFF, which occurs when the rectified input voltage $V_{IN\_R}$ is at its minimum, then transistor Q1 has no current injected into its base and therefore the current through the collector of this transistor and thus through the resistor RC3 is negligible. As a result, the transistor M1 receives approximately the voltage $V_{IN\_R}$ at it gate, turning ON the transistor and thereby connecting the resistor RCURR_HOLD across the rectified input voltage $V_{IN\_R}$ (i.e., connecting resistor RCURR_HOLD across terminals 30c and 30d). The current $I_{RCURR\_HOLD}$ through the resistor RCURR_HOLD is again given by the above equation. Conversely, when the rectified input voltage $V_{IN\_R}$ has its maximum value, current from transistor 56 turns ON the transistor Q1 which, in turn, drives the voltage applied to the gate of the transistor M1 to a voltage level that turns the transistor M1 OFF. In this situation no meaningful current flows through the resistor RCURR_HOLD as this resistor is effectively isolated from the rectified input voltage $V_{IN\_R}$ by the deactivated transistor M1.

Figure 6B:
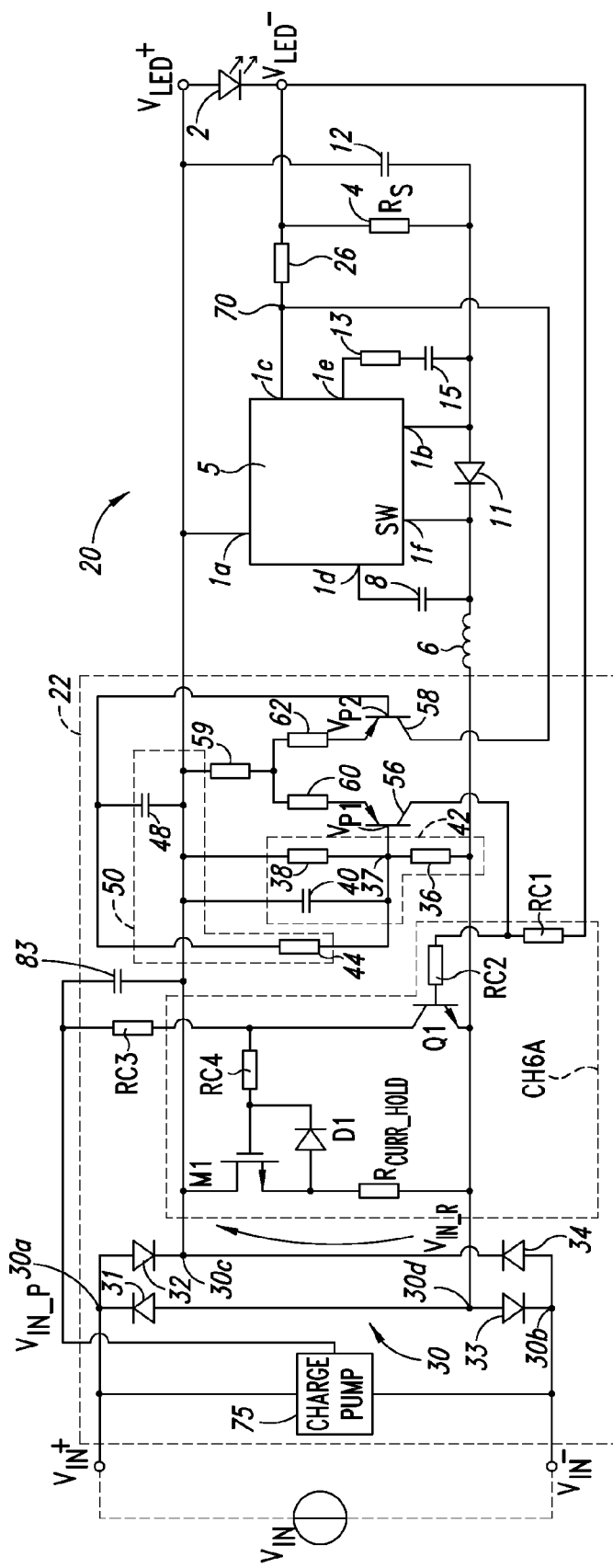
FIG. 6b illustrates a still further circuit implementation of the biasing and driving circuit of FIG. 3a, according to yet another embodiment of the present disclosure.

FIG. 6b illustrates a still further circuit implementation of the biasing and driving circuit 20 of FIG. 3a according to yet another embodiment of the present disclosure. In this embodiment, the pumped voltage VIN_P generated by the charge pump 75 is supplied to bias the only current holder circuit CH6A. This is in contrast to the embodiment of FIG. 6 where the pumped voltage VIN_P is applied to bias only the current generator 22 and the embodiment of FIG. 6a where the pumped voltage VIN_P is applied to bias both the current generator 22 and the current holder circuit CH6A. The use of the pumped voltage VIN_P has the benefit of increasing the voltage biasing of M1 gate, so it helps connecting the resistive load at the output of the electronic transformer when the voltage VIN_R is at its very minimum, i.e. at the beginning of every power line cycle.

Figure 7:
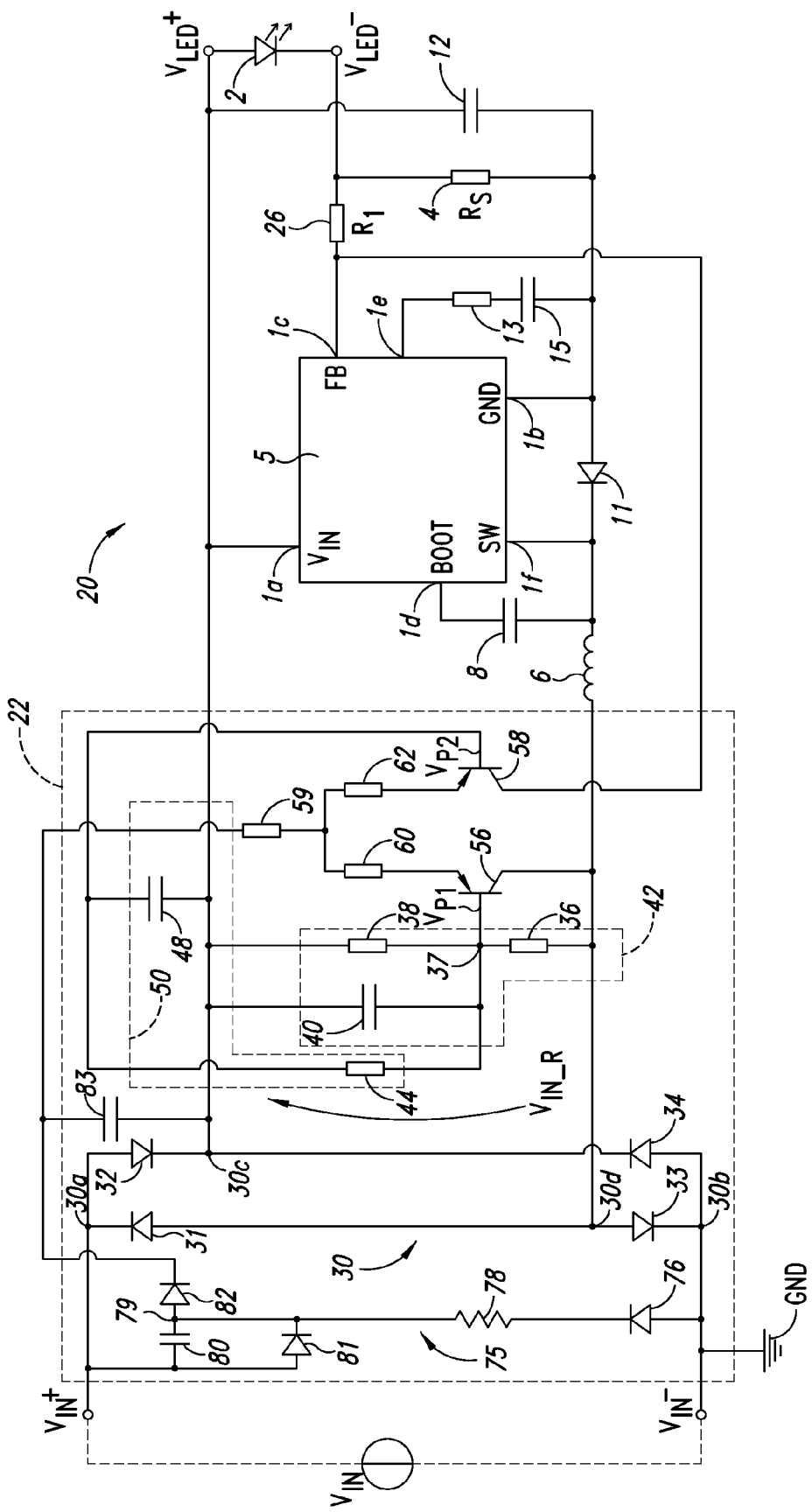
FIG. 7 illustrates, in greater detail, the biasing and driving circuit of FIG. 6.

FIG. 7 shows a circuit embodiment of the charge pump 75 of FIG. 6. Elements of the circuit of FIG. 7 that are in common with those of the circuit of FIG. 6 are designated by the same reference numbers and are not described any further. The charge pump 75 includes a diode 76 and a resistor 78 (e.g., with a resistance of 1 kΩ), connected together in series between the input terminal at the voltage $V_{IN}^-$ (ground reference GND) and an intermediate node 79; in particular, the diode 76 has its anode coupled to $V_{IN}^-$ and its cathode coupled to the resistor 78. Furthermore, the charge pump 75 includes a capacitor 80 (e.g., with a capacitance of 220 nF) and a Zener diode 81 coupled in parallel to one another, between the intermediate node 79 and the input terminal at the voltage $V_{IN}^+$; in particular, the Zener diode 81 has its anode coupled to $V_{IN}^+$ and its cathode coupled to the intermediate node 79. A diode 82, having its anode coupled to the intermediate node 79, is set on the output of the charge pump 75, for supplying at output the signal $V_{IN\_P}$.

The advantages obtained emerge clearly from the foregoing description.

In particular, the biasing and driving circuit described may be used for any generic SMPS, enabling operative coupling of said generic SMPS with a generic electronic transformer that requires a resistive load at the output of the transformer. Consequently, the power factor is increased.

The biasing and driving circuit described further supports SMPSs with both current-mode and voltage-mode internal architecture.

Modifications and variations may be made to the device and to the method described herein, without thereby departing from the scope of the present disclosure, as defined in the annexed claims.

In particular, the present disclosure applies to any generic feedback voltage regulator (whether of the SMPS switching type or of the linear type).

Furthermore, the driven electric load may be a generic electric load, not limited to the string of LEDs.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A biasing and driving circuit for an electric load, having input terminals configured to receive an a.c. input voltage and output terminals configured to supply a d.c. output voltage to said electric load, comprising:
    a voltage regulator with a feedback loop having a feedback input configured to receive a sensing voltage that is a function of a supply current that flows through the electric load and for regulating, on the basis of the sensing voltage received, said supply current; and
    a resistive sensing element, operatively coupled to the feedback input, configured to receive the supply current and generate said sensing voltage as a function of said supply current received;
    a current transducer, of a resistive type, coupled to the feedback input; and
    an auxiliary biasing circuit configured to receive said a.c. input voltage and to inject through said current transducer an a.c. auxiliary biasing current that varies in a way inversely proportional to the a.c. input voltage.

2. The biasing and driving circuit according to claim 1, wherein the auxiliary biasing circuit includes:
   a rectifier, configured to receive the a.c. input voltage, rectify the a.c. input voltage, and to supply at an output a rectified voltage;
   a differential stage, having a first output coupled to the feedback input for supplying the a.c. auxiliary biasing current;
   a voltage-divider unit, configured to receive the rectified voltage and supply a first operating voltage, obtained as a partition of the rectified voltage, to a first input of the differential stage; and
   an integrator unit, configured to receive the divided voltage and supply to a second input of the differential stage a second operating voltage obtained as integral of the first operating voltage.

3. The biasing and driving circuit according to claim 2, wherein the differential stage includes a first transistor and a second transistor, driven respectively by the first and second operating voltages, outputting the a.c. auxiliary biasing current which has a first operating value when the rectified voltage has a value maximum in modulus; and a second operating value, higher than the first operating value, when the rectified voltage has a value minimum in modulus.

4. The biasing and driving circuit according to claim 3, wherein a bandwidth of the feedback loop is higher than a maximum frequency of the a.c. auxiliary biasing current.

5. The biasing and driving circuit according to claim 4, wherein the voltage regulator is a regulator of an SMPS type, said feedback loop comprising an error amplifier coupled to the feedback input, having a first input configured to receive the sensing voltage, a second input configured to receive a feedback reference voltage, and an output for supplying a control signal,
   said first operating value being a current value equal to substantially zero, and the second operating value being a current value such that said current transducer biases the feedback input at a voltage value equal to the feedback voltage reference of the error amplifier.

6. The biasing and driving circuit according to claim 2, further comprising a charge pump configured to receive the a.c. input voltage and to generate a biasing voltage configured to bias said differential stage.

7. The biasing and driving circuit according to claim 6, further comprising:
   a first controllable switching element coupled in series with a first resistive element across the output of the rectifier;
   a second controllable switching element coupled in series with a second resistive element between one side of the output of the rectifier and the charge pump to receive the biasing voltage, a node being defined at the interconnection of the second controllable switching element and the second resistive element and the node being coupled to the first controllable switching element; and
   wherein the differential stage includes a second output that controls the second controllable switching element to selectively activate the first controllable switching element to couple the first resistive element across the output of the rectifier or to isolate the resistive element from the output of the rectifier.

8. The biasing and driving circuit according to claim 2, further comprising a current holder circuit comprising:
   a controllable switching element coupled in series with a resistive element across the output of the rectifier; and
   wherein the differential stage includes a second output that controls the controllable switching element to couple the resistive element across the output of the rectifier or to isolate the resistive element from the output of the rectifier.

9. The biasing and driving circuit according to claim 2, further comprising:
   a charge pump configured to receive the a.c. input voltage and to generate a biasing voltage;
   a first controllable switching element coupled in series with a first resistive element across the output of the rectifier and coupled to the charge pump to receive the biasing voltage to bias the first controllable switching element; and
   a second controllable switching element coupled in series with a second resistive element between one side of the output of the rectifier and the charge pump to receive the biasing voltage, a node being defined at the interconnection of the second controllable switching element and the second resistive element and the node being coupled to the first controllable switching element.

10. The biasing and driving circuit according to claim 1, wherein said electric load comprises a string of light-emitting devices.

11. The biasing and driving circuit according to claim 1, further comprising a current holder circuit configured to couple a resistive element between the input terminals responsive to the a.c. auxiliary biasing current being greater than a threshold value.

12. The biasing and driving circuit according to claim 1, wherein the a.c. input voltage is a sinusoidal signal and the auxiliary biasing current is a sinusoidal signal having an approximately 180 degree phase shift relative to the a.c. input voltage.

13. An electronic system, comprising:
   an electronic load;
   a feedback voltage regulator circuit having a feedback loop including a feedback input terminal configured to receive a sensing voltage that is a function of a supply current through the electronic load, and the feedback voltage regulator configured to regulate, on the basis of the sensing voltage, the supply current;
   a resistive sensing element, operatively coupled to the feedback input terminal, configured to receive the supply current and to generate the sensing voltage as a function of the supply current;
   a current transducer coupled to the feedback input terminal; and
   an auxiliary biasing circuit configured to receive an a.c. input voltage and to supply through the current transducer an a.c. auxiliary biasing current that is inversely proportional to the a.c. input voltage.

14. The electronic system of claim 13, wherein the feedback voltage regulator circuit comprises one of a switching-mode power supply (SMPS) and a linear power supply.

15. The electronic system of claim 13, wherein the electronic load comprises at least one light-emitting diode.

16. The electronic system of claim 13, wherein the auxiliary biasing circuit is external to an integrated circuit that includes the feedback voltage regulator circuit.

17. A method of controlling a feedback voltage regulator circuit, the method comprising:

generating a sensing voltage as a function of a supply current through an electronic load coupled to the feedback voltage regulator circuit;

coupling the sensing voltage to a feedback input of the feedback voltage regulator circuit to generate a feedback voltage on the feedback input;

generating an a.c. auxiliary biasing current that is inversely proportional to an a.c. input voltage; and providing the a.c. auxiliary biasing current to the feedback input to thereby control the value of the feedback voltage on the feedback input.

18. The method of claim 17, further comprising:

rectifying the a.c. input voltage; and supplying the rectified a.c. input voltage to a supply input of the feedback voltage regulator circuit.

19. The method of claim 18, further comprising utilizing a differential pair of transistors to generate the a.c. auxiliary biasing current that is provided to the feedback input.

20. The method of claim 19, further comprising:

generating a pumped voltage from the a.c. input voltage; and providing the pumped voltage to bias the differential pair of transistors.

21. The method of claim 20 further comprising coupling a resistive element across to the rectified a.c. input voltage responsive to the a.c. auxiliary biasing current being greater than a threshold value.

\* \* \* \* \*